(12) United States Patent
Dai et al.

(10) Patent No.: US 12,462,713 B2
(45) Date of Patent: Nov. 4, 2025

(54) LOCKING MECHANISM AND ASSEMBLED DISPLAY PANEL

(71) Applicant: Voxel Inc, West Sacramento, CA (US)

(72) Inventors: Zhiming Dai, Guangdong (CN); Haoyi Zhang, Guangdong (CN)

(73) Assignee: Voxel Inc, West Sacramento, CA (US)

( * ) Notice: Subject to any disclaimer, the term of this patent is extended or adjusted under 35 U.S.C. 154(b) by 4 days.

(21) Appl. No.: 18/592,759

(22) Filed: Mar. 1, 2024

(65) Prior Publication Data

US 2025/0279015 A1 Sep. 4, 2025

(51) Int. Cl.
*G09F 9/30* (2006.01)
*G02F 1/1333* (2006.01)

(52) U.S. Cl.
CPC .......... *G09F 9/30* (2013.01); *G02F 1/133322* (2021.01); *G02F 1/13336* (2013.01)

(58) Field of Classification Search
None
See application file for complete search history.

(56) References Cited

U.S. PATENT DOCUMENTS

2019/0303086 A1* 10/2019 Nagayama .......... G02F 1/13336
2023/0267856 A1*  8/2023 Zhang ................... G09F 9/3026
                                                                  361/679.01

* cited by examiner

*Primary Examiner* — Ifedayo B Iluyomade (57) ABSTRACT

Disclosed are a locking mechanism and an assembled display panel, including a plurality of housings, display panels and splicing assemblies, two adjacent housings are abutted against each other, and the display panels are arranged on the plurality of housings; and the splicing assembly is connected with at least two housings.

8 Claims, 8 Drawing Sheets

LOCKING MECHANISM AND ASSEMBLED DISPLAY PANEL

TECHNICAL FIELD

The present disclosure relates to the technical field of display panels, and particularly relates to a locking mechanism and an assembled display panel.

BACKGROUND ART

A large display screen is inconvenient to transport, so an assembled display screen comes into being, where multiple small display screens are spliced into one single large display screen.

Currently, an assembled display panel includes housings and display panels, where multiple housings are arranged; the display panels are arranged on the housings; and finally, individual housings are connected through connecting bolts at locations where connections are required.

The inventor believes that the above prior art has the following detects: each housing is connected separately, which takes lots of time to adjust the flatness of two adjacent housings when multiple housings are installed, so as to ensure that multiple display panels are in a same reference plane; however, each housing is installed separately and adjustment is required for each housing, resulting in a low efficiency.

SUMMARY

In order to improve the efficiency, the present disclosure provides a locking mechanism and an assembled display panel using the locking mechanism.

In a first aspect, the present disclosure provides a locking mechanism, which adopts the following technical solution: the locking mechanism includes at least one splicing assembly, where the splicing assembly includes at least two splicing blocks, a limiting protruding block, a fixing base and a locking screw rod, and the splicing blocks are configured for mounting on a housing supporting a display panel; the locking screw rod is vertically arranged on one side of the fixing seat close to the splicing block; and the locking screw rod is configured for connecting with the splicing block, such that the fixing base is abutted against the limiting protruding block.

By adopting the above technical solution, each housing is provided with a splicing block, and the splicing block is positioned by the limiting protruding block on the splicing block, such that the splicing block is abutted against the fixing base; when all the splicing blocks of the same splicing assembly are jointly abutted against the fixing bases of the same splicing assembly, the splicing blocks of the same splicing assembly are located in a same reference plane, such that a plurality of housings are located in the same reference plane, and a plurality of display panels are accordingly located in the same reference plane; and the splicing block and the fixing seat are connected by the locking screw rod to realize the connection among a plurality of splicing blocks and finally the connection among the plurality of housings; and the arrangement of the splice assembly can reduce the adjustment time of housings, thereby improving efficiency.

In a preferred implementation, the splicing block is two; the fixing base includes a first fixing portion, a second fixing portion and a third fixing portion, where the first fixing portion and the second fixing portion are respectively provided at both ends of the third fixing portion; the first fixing portion is abutted against one of the splicing blocks and one of the limiting protruding blocks, and the second fixing portion is abutted against the other splicing block and the other limiting protruding block; the first fixing portion is provided with the locking screw rod, and the locking screw rod on the first fixing portion is connected to the splicing block abutting against the first fixing portion; and the second fixing portion is provided with the locking screw rod, and the locking screw rod on the second fixing portion is connected to the splicing block abutting against the second fixing portion.

By adopting the above technical solution, the first fixing portion is abutted against one of the splicing blocks and one of the limiting protruding blocks; the second fixing portion is abutted against the other splicing block and the limiting protruding block on the other splicing block; when the fixing base is mounted, the first fixing portion and the second fixing portion can be positioned by the limiting protruding blocks on the two splicing blocks, the first fixing portion and the splicing block abutting against the first fixing portion can be then connected by the locking screw rod, and the second fixing portion and the splicing block abutting against the second fixing portion can be also connected by the locking screw rod; and when the first fixing portion is abutted against one of the splicing blocks, and the second fixing portion is abutted against the other splicing block, two housings provided with the splicing blocks are located in a same reference plane.

In a preferred implementation, the number of the splicing block is four; adjacent two splicing blocks are close to each other, a limiting hole is formed on the fixing base, four splicing blocks are all abutted against the fixing base, four limiting protruding blocks all pass through the limiting hole, and the four limiting protruding blocks are all abutted against a side wall of the limiting hole.

By adopting the above technical solution, the four limiting protruding blocks jointly pass through the limiting hole, the four limiting protruding blocks are all abutted against a side wall of the limiting hole, the four splicing blocks are all then abutted against the fixing base, and finally the fixing bases and the splicing blocks are connected by the locking screw rod.

In a preferred implementation, the fixing base is provided with a reinforcement assembly, where the reinforcement assembly includes a snap bead and a spring, a sliding groove in communication with the limiting hole is formed on the fixing base, the snap bead is slidable in the sliding groove, and a slot is formed on the limiting protruding block for snap-fitting with the snap bead; and one end of the spring away from the snap bead is connected to the bottom wall of the sliding groove.

By adopting the above technical solution, when the limiting protruding block passes through the limiting hole, and the fixing base is not abutted against the splicing block, the snap bead will be pressed into the sliding groove, and the spring will be compressed; when an axis of the sliding groove coincides with an axis of the slot, the spring will recover elastic deformation, under the action of the elastic force of the spring, the snap bead will pop up from the sliding groove and is snapped into the slot on the limiting protruding block, in such case, the four splicing blocks are all abutted against the fixing base, and the fixing bases and the splicing blocks are connected by the locking screw rod; and the arrangement of the reinforcement assembly facilitates the connection between the splicing blocks and the fixing base.

In a second aspect, the present disclosure provides an assembled display panel, which adopts the following technical solution: the assembled display panel includes a plurality of housings, display panels and splicing assemblies, where two adjacent housings are abutted against each other, and the display panels are arranged on the housings; and a same splicing assembly is connected with at least two housings, the splicing blocks of the same splicing assembly are allocated to the housings connected by the same splicing assembly, at least one splicing block is arranged on each housing, and the fixing base of the same splicing assembly is connected to the splicing blocks of the same splicing assembly.

By adopting the above technical solution, the fixing base of the same splicing assembly is connected to the splicing blocks of the same splicing assembly and located on different housings through the locking screw rod; when the splicing blocks of the same splicing assembly are all abutted against the fixing base, the splicing blocks of the same splicing assembly are all located in the same reference plane; at least the housings connected by the splicing assembly are also located in the same reference plane, such that the adjustment time of housings is reduced, and efficiency is improved; and connecting lines are generally arranged inside the housing, and the connecting lines can be avoided when at least two housings are connected through the splicing assembly.

In a preferred implementation, the splicing assembly is connected with two housings, the number of the splicing blocks is two, one splicing block is arranged on each housing, and two splicing blocks located on the two splicing blocks are abutted against each other.

By adopting the above technical solution, the fixing base of the splicing assembly is connected with the two splicing blocks on the two housings, and the two housings are accordingly located in a same reference plane.

In a preferred implementation, the splicing assembly is connected with two housings, the number of the splicing blocks is four, four splicing blocks are arranged on each housing, and adjacent two splicing blocks are abutted against each other.

By adopting the above technical solution, the fixing base of the splicing assembly is connected with the four splicing blocks on the two housings, and the two housings are accordingly located in a same reference plane.

In a preferred implementation, the splicing assembly is connected with the four housings, the number of the splicing blocks is four, one splicing block is arranged on each housing, and adjacent two splicing blocks are abutted against each other.

By adopting the above technical solution, the fixing base of the splicing assembly is connected with the four splicing blocks on the four housings, and the four housings are accordingly located in a same reference plane.

In a preferred embodiment, the splice assembly is connected with three housings, and the number of the splicing blocks is four; the side wall of the first housing in the length direction is abutted against the side wall of the second housing in the length direction, and the side wall of the first housing in the width direction and the side wall of the second housing in the width direction are both abutted against the side wall of the third housing in the length direction; and the two splicing blocks are arranged on the third housing, the other two splicing blocks are arranged on the first housing and the second housing, respectively, and adjacent two splicing blocks are abutted against each other.

By adopting the above technical solution, one of the three housings abutting against one another in a same display area is provided with two splicing blocks, each of the other two splicing blocks is provided with one splicing block, the fixing base of the same splicing block in the splicing assembly are connected with four splicing blocks on three housings, and the three housings are accordingly located in the same plane; the assembled display panel can be divided into at least two display areas, when the number of the display area is two, the splicing assembly is connected with two housings in one display area and a housing in the other display area, each of the two housings in the same display area is provided with a splicing block, the housing in the other display area is provided with two splicing blocks, the fixing base of the same splicing assembly is connected with the four splicing blocks on the three housings, and the three housings in the two display areas will be accordingly located in the same reference plane.

In a preferred embodiment, the housing is provided with a connecting plate, and the connecting plates of two adjacent housings are abutted against each other; the display panel is abutted against the connecting plate, and an avoidance groove is formed on the connecting plate.

By adopting the above technical solution, the connecting plate is capable of supporting the display panel, and the avoidance groove can facilitate the passage of some of the connecting lines on the housings into adjacent housings.

To sum up, the present disclosure has the following beneficial technical effects: the arrangement of the splicing assembly can improve efficiency; and the arrangement of the reinforcement assembly can facilitate the connection between the splicing blocks and the fixing base.

Reference numerals in the drawings: 1. splicing assembly; 11. splicing block; 12. limiting protruding block; 121. slot; 13. fixing base; 131. first fixing portion; 132. second fixing portion; 133. third fixing portion; 134. guide hole; 135. limiting hole; 136. sliding groove; 14. locking screw; 15. guide post; 2. reinforcement assembly; 21. snap bead; 22. spring; 3. housing; 4. display panel; 5. connecting plate; and 51. avoidance groove.

DETAILED DESCRIPTION OF THE EMBODIMENTS

The present disclosure will be further described in detail below in conjunction with FIGS. 1-8.

The embodiments of the present disclosure disclose a locking mechanism.

Figure 1:
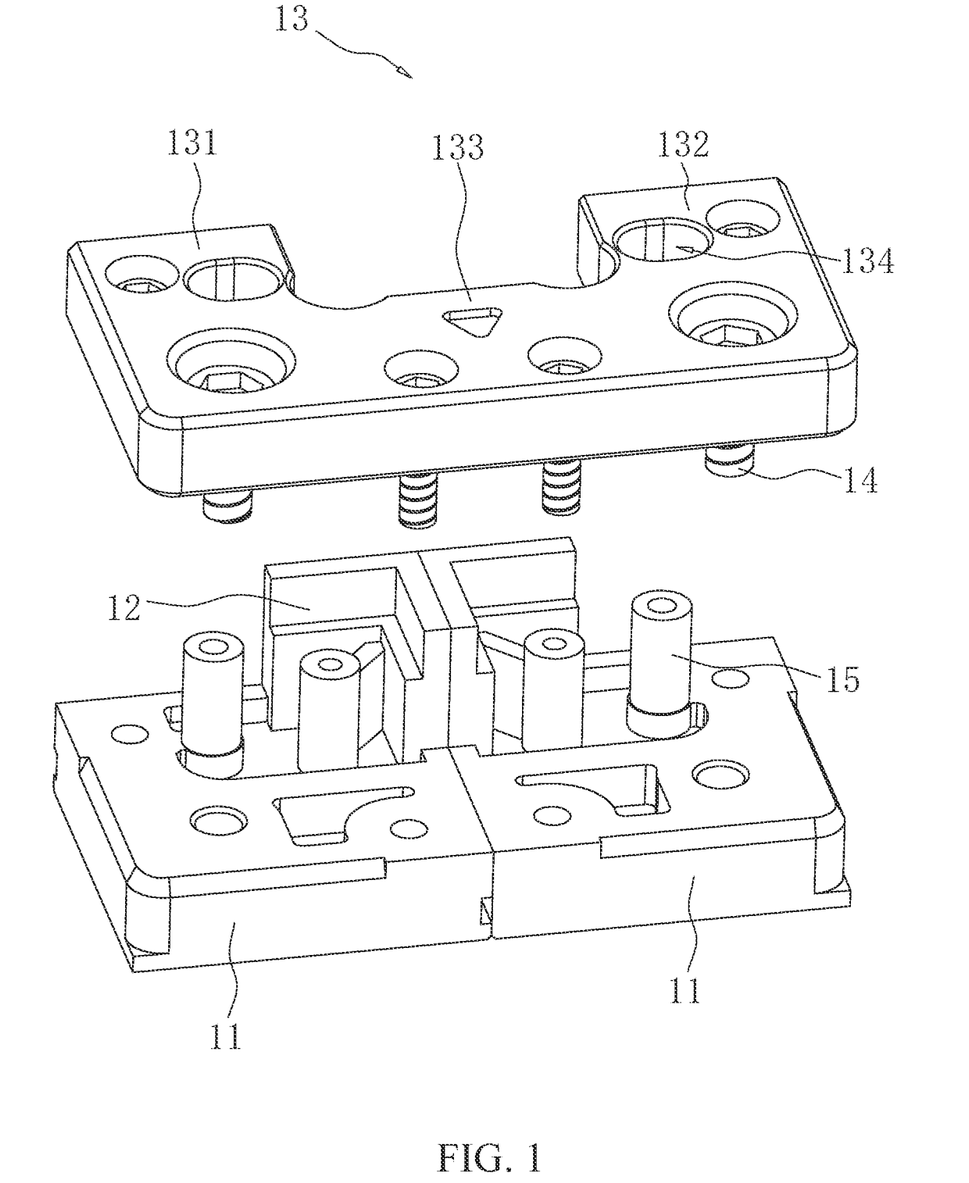
FIG. 1 is a structural schematic diagram of a locking mechanism in Embodiment 1 according to the present disclosure.

Embodiment 1: With reference to FIG. 1, a locking mechanism includes a splicing assembly 1, where the splicing assembly 1 includes at least a splicing block 11, a limiting protruding block 12 connected to the splicing block 11, a fixing base 13 abutting the splicing block 11, and a locking screw rod 14; and a guide post 15 is fixedly connected to the splicing block 11, and a guide hole 134 through which the guide post 15 passes is formed on the fixing base 13.

The locking screw rod 14 is a locking bolt.

With reference to FIG. 1, the number of the splicing block 11 can be two, and the two splicing blocks 11 are abutted against each other; and two limiting protruding blocks 12 on the two splicing blocks 11 are abutted against each other.

The fixing base 13 has a C-shaped cross section, the fixing base 13 includes a third fixing portion 133, one end of the third fixing portion 133 is integrally provided with a first fixing portion 131, the other end thereof is integrally provided with a second fixing portion 132, and the first fixing portion 131 and the second fixing portion 132 are located on a same side of the third fixing portion 133.

One end of the third fixing portion 133 is abutted against a first splicing block 11, and the other end thereof is abutted against a second splicing block 11. The first fixing portion 131 is abutted against the first splicing block 11, and the side of the upper limiting protruding block 12 of the first splicing block 11 away from the upper limiting protruding block 12 of the second splicing block 11 is abutted against a side wall of the first fixing portion 131 facing the second fixing portion 132. The second fixing portion 132 is abutted against the second splicing block 11, and the side of the upper limiting protruding block 12 of the second splicing block 11 away from the upper limiting protruding block 12 of the first splicing block 11 is abutted against a side wall of the second fixing portion 132 facing the first fixing portion 131.

The side of the upper limiting protruding block 12 of the first splicing block 11 away from the first fixing portion 131 and the side of the upper limiting protruding block 12 of the second splicing block 11 away from the second fixing portion 132 is abutted against the third fixing portion 133.

The guide hole 134 is formed on both the first fixing portion 131 and the second fixing portion 132.

The first fixing portion 131 is provided with a locking bolt that is in threaded connection with the first splicing block 11; and one end of the third fixing portion 133 connected to the first fixing portion 131 is also provided with a locking bolt that is in threaded connection with the first splicing block 11. The second fixing portion 132 is provided with a locking bolt that is in threaded connection with the second splicing block 11; and one end of the third fixing portion 133 connected to the third fixing portion 132 is also provided with a locking bolt that is in threaded connection with the second splicing block 11.

The implementation principle of Embodiment 1 of the present disclosure is as follows: the guide post 15 is passed through the guide hole 134, and the two limiting protruding blocks 12 abutted against each other and the two splicing blocks 11 abutted against each other are both abutted against third fixing portion 133.

The locking bolt is passed through the first fixing portion 131 and is in threaded connection with the splicing block 11 abutted against the first fixing portion 131, and the locking bolt is passed through one end of the third fixing portion 133 close to the first fixing portion 131 and is in threaded connection with the splicing block 11 abutted against the first fixing portion 131; and the locking bolt is passed through the second fixing portion 132 and is in threaded connection with the splicing block 11 abutted against the second fixing portion 132, and the locking bolt is passed through one end of the third fixing portion 133 close to the second fixing portion 132 and is in threaded connection with the splicing block 11 abutted against the second fixing portion 132.

Embodiment 2

Figure 2:
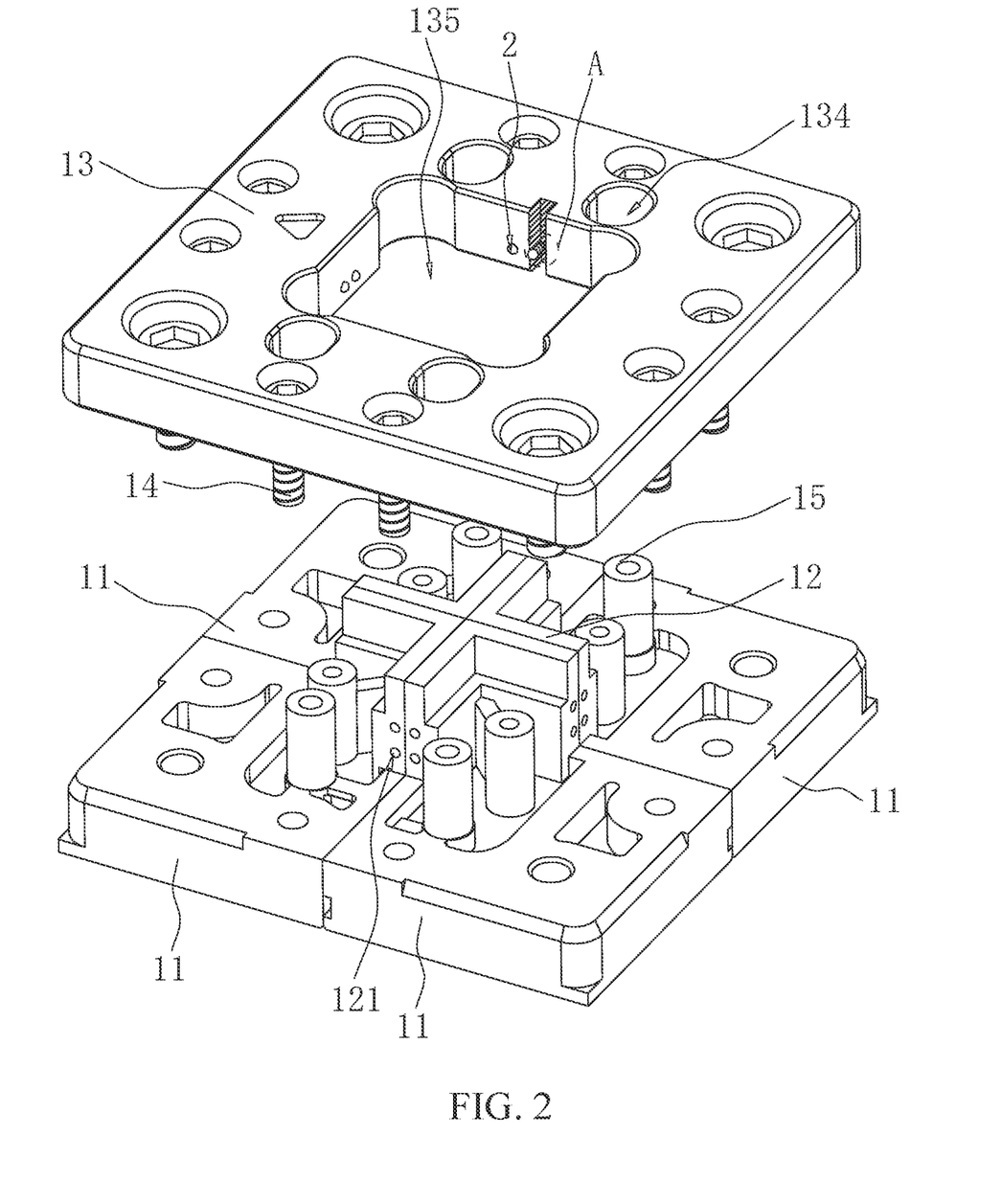
FIG. 2 is a structural schematic diagram of a locking mechanism in Embodiment 2 according to the present disclosure.

With reference to FIG. 2, the number of the splicing block 11 can be four, and the two adjacent splicing blocks 11 are abutted against each other; and two limiting protruding blocks 12 on the two splicing blocks 11 abutted against each other are also abutted against each other.

An upper limiting hole 135 is formed on the fixing base 13, and the cross section of the fixing base 13 round-shaped; four limiting protruding blocks 12 all pass through the limiting hole 135, and the four limiting protruding blocks 12 are all abutted against a side wall of the limiting hole 135; and the four splicing blocks 11 are all abutted against the fixing base 13.

The locking bolt passes through the fixing base 13 and is in threaded connection with the splicing block 11.

Figure 3:
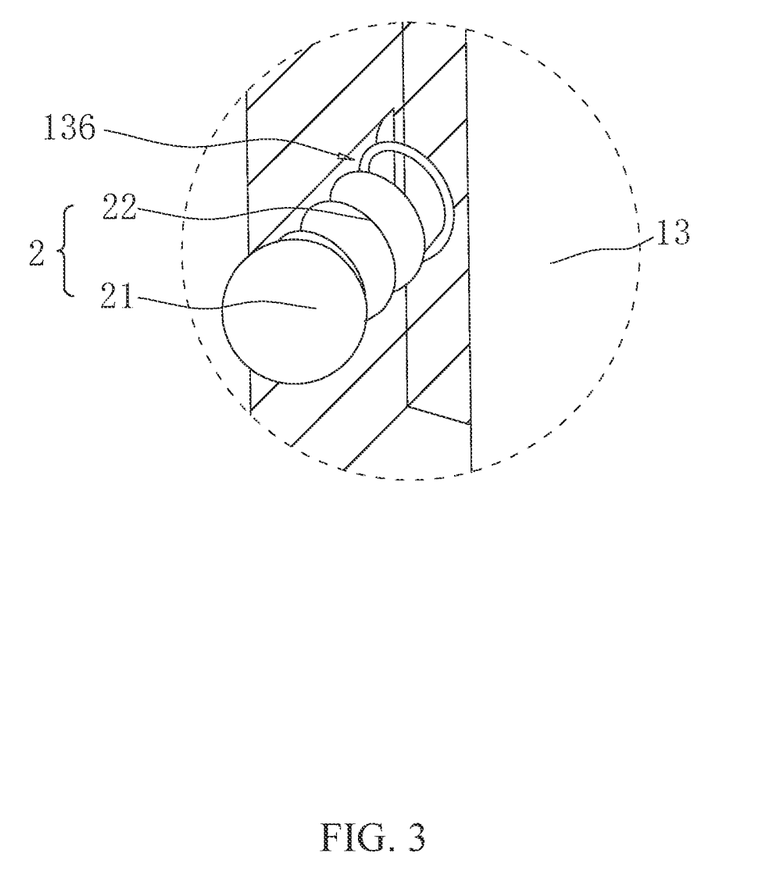
FIG. 3 is an enlarged view of A in FIG. 2, showing a reinforcement assembly.

With reference to FIGS. 2-3, a slot 121 is formed on the limiting protruding block 12, and a sliding groove 136 in communication with the limiting hole 135 is formed on the fixing base 13; the fixing base 13 is provided with a reinforcement assembly 2, the reinforcement assembly 2 includes a snap bead 21 slidably connected in the sliding groove 136, and the snap bead 21 is snapped into the slot 121; a spring 22 is connected to the snap bead 21 in the sliding groove 136, and one end of the spring 22 away from the snap bead 21 is connected to the bottom wall of the sliding groove 136.

The implementation principle of Embodiment 2 of the present disclosure is as follows: the four limiting protruding blocks 12 are all passed through the limiting hole 135 on the fixing base 13, and the four limiting protruding blocks 12 are all abutted against the side wall of the limiting hole 135.

When the fixing base 13 is not abutted against the splicing block 11, the snap bead 21 will be pressed into the sliding groove 136, and the spring 22 will be then compressed; when an axis of the sliding groove 136 coincides with an axis of the slot 121, the spring 22 will recover elastic deformation; and under the action of the elastic force of the spring 22, the snap bead 21 will pop up from the sliding groove 136 and is snapped into the slot 121 on the limiting protruding block 12, in such case, the four splicing blocks 11 are all abutted against the fixing base 13, and finally, the locking bolt is passed through the fixing base 13 and is in threaded connection with the splicing block 11.

Figure 4:
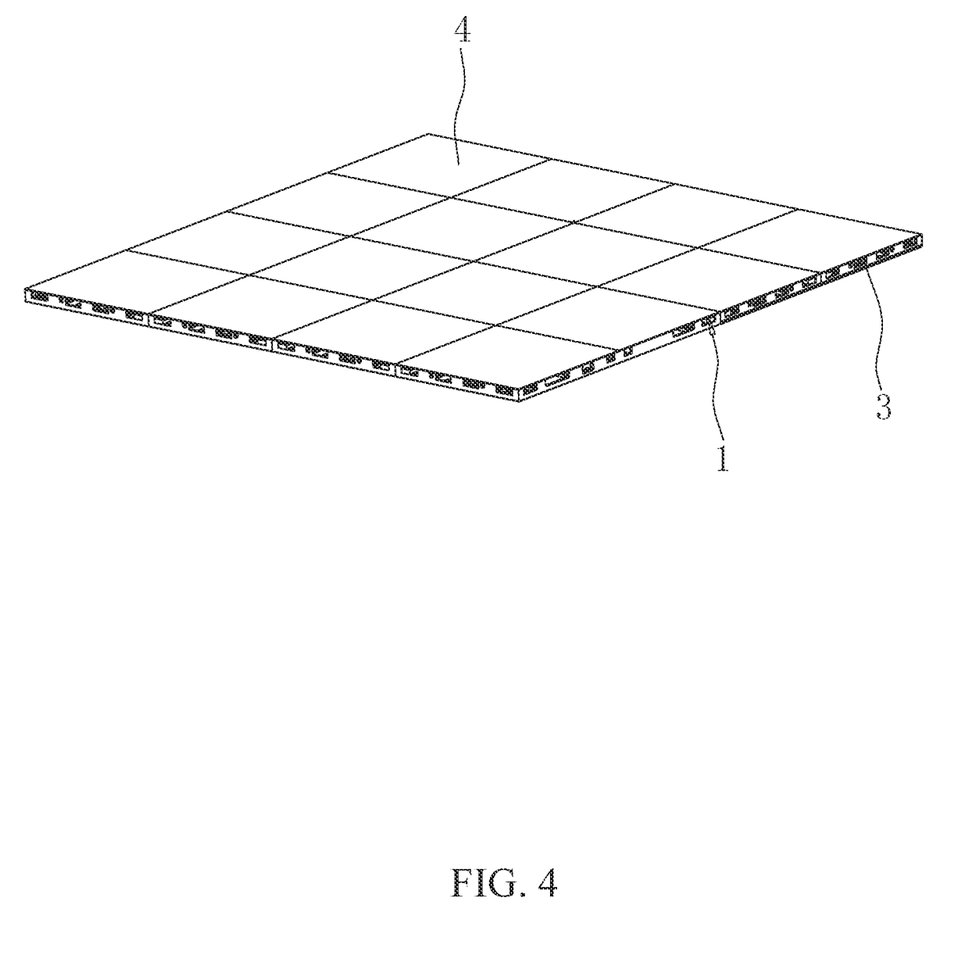
FIG. 4 is a structural schematic diagram of an assembled display panel according to the present disclosure.

An embodiment of the present disclosure further discloses an assembled display panel. With reference to FIG. 4, the assembled display panel includes housings 3, display panels 4 and a splicing assembly 1, where a plurality of housings 3 are arranged, the cross section of the housing 3 is rectangular, and two adjacent housings 3 are abutted against each other; the display panels 4 are snapped into the housing 3; and the splicing assembly 1 can connect at least two housings 3.

Figure 5:
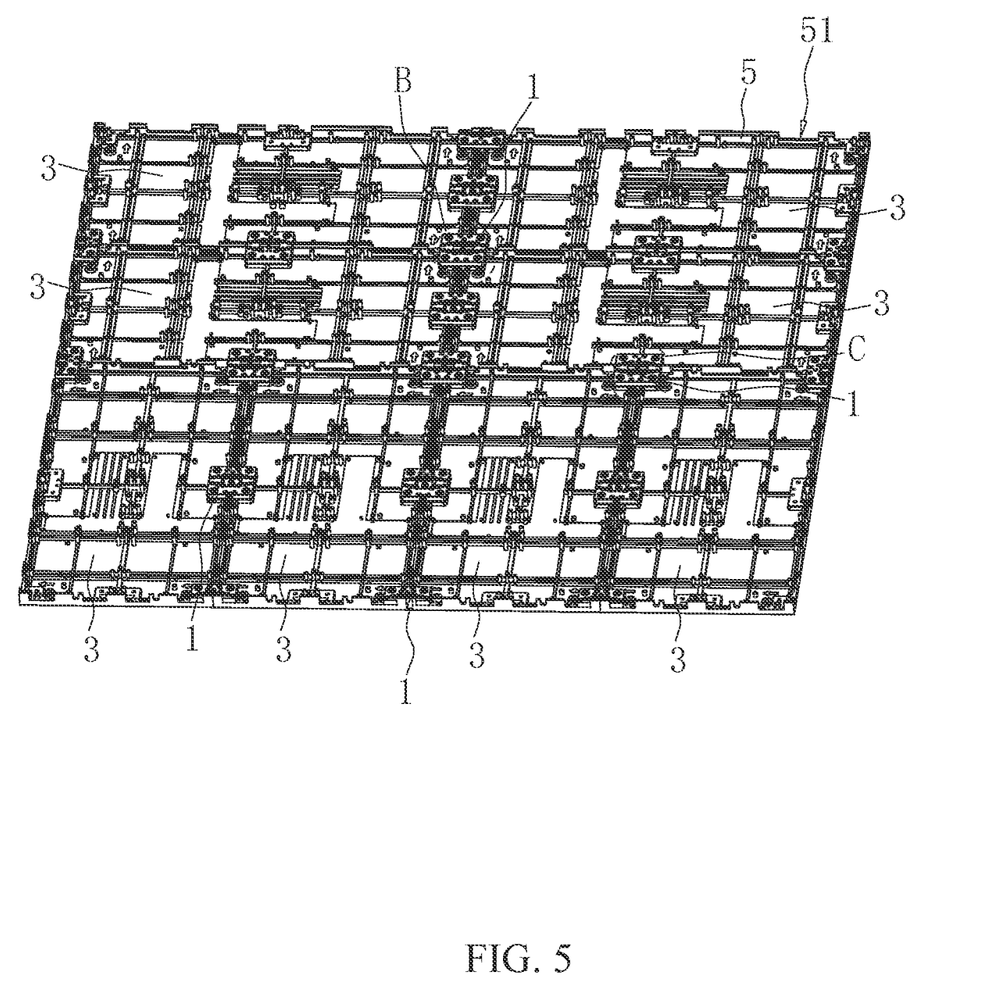
FIG. 5 is a structural schematic diagram of a connection between a locking mechanism and a housing according to the present disclosure.
Figure 6:
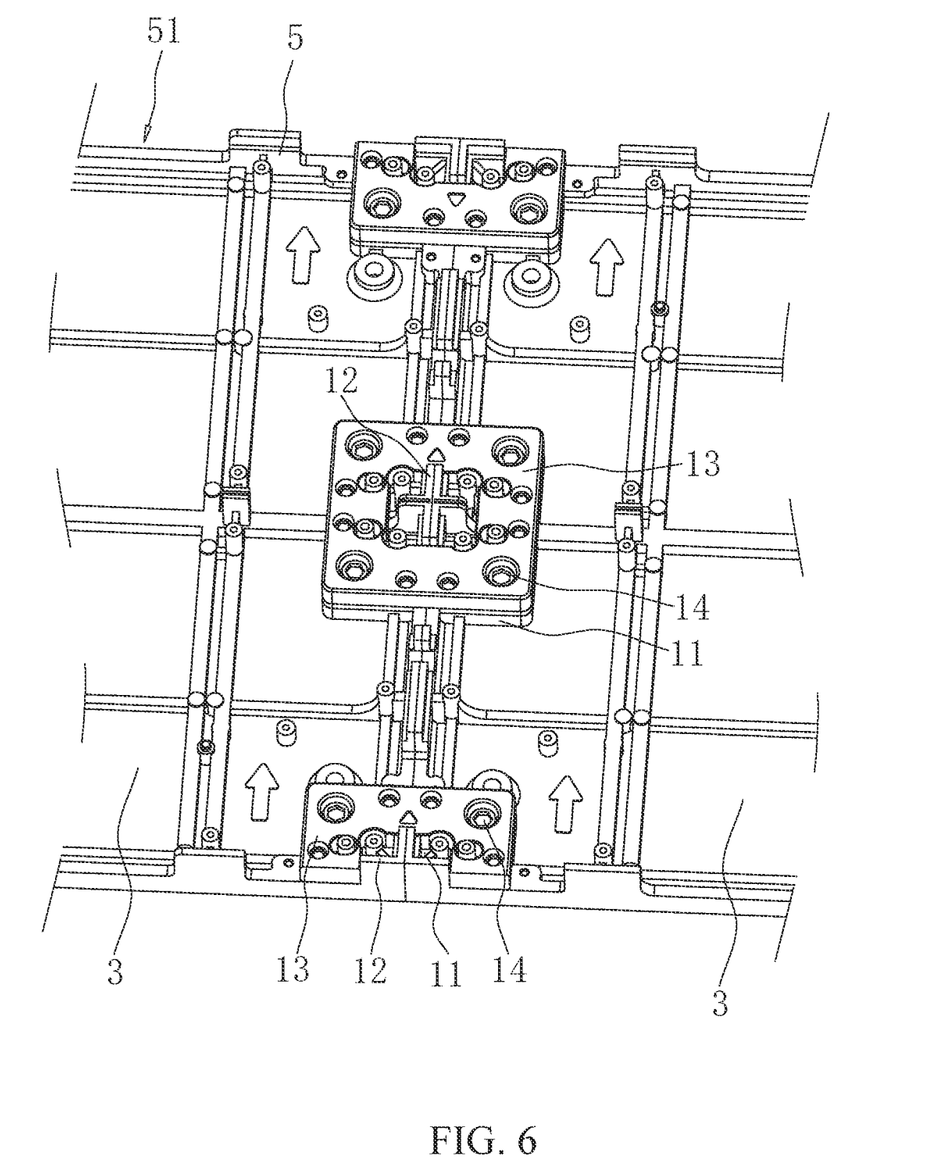
FIG. 6 is a structural schematic diagram of a connection between two housings through a splicing assembly according to the present disclosure.

With reference to FIGS. 5-6, the splicing assembly 1 connects two housings 3 that are abutted against each other.

The splicing block 11 of the same splicing assembly 1 can be two or four.

When the number of the splicing block 11 is two, one splicing block 11 is arranged on each housing 3, and the fixing base 13 with a C-shaped cross section connects the two splicing blocks 11 on the two housings 3.

When the number of the splicing block 11 can be four, two splicing blocks 11 are arranged on each housing 3, and the fixing base 13 with a round-shaped cross section connects the four splicing blocks 11 on the two housings 3.

Figure 7:
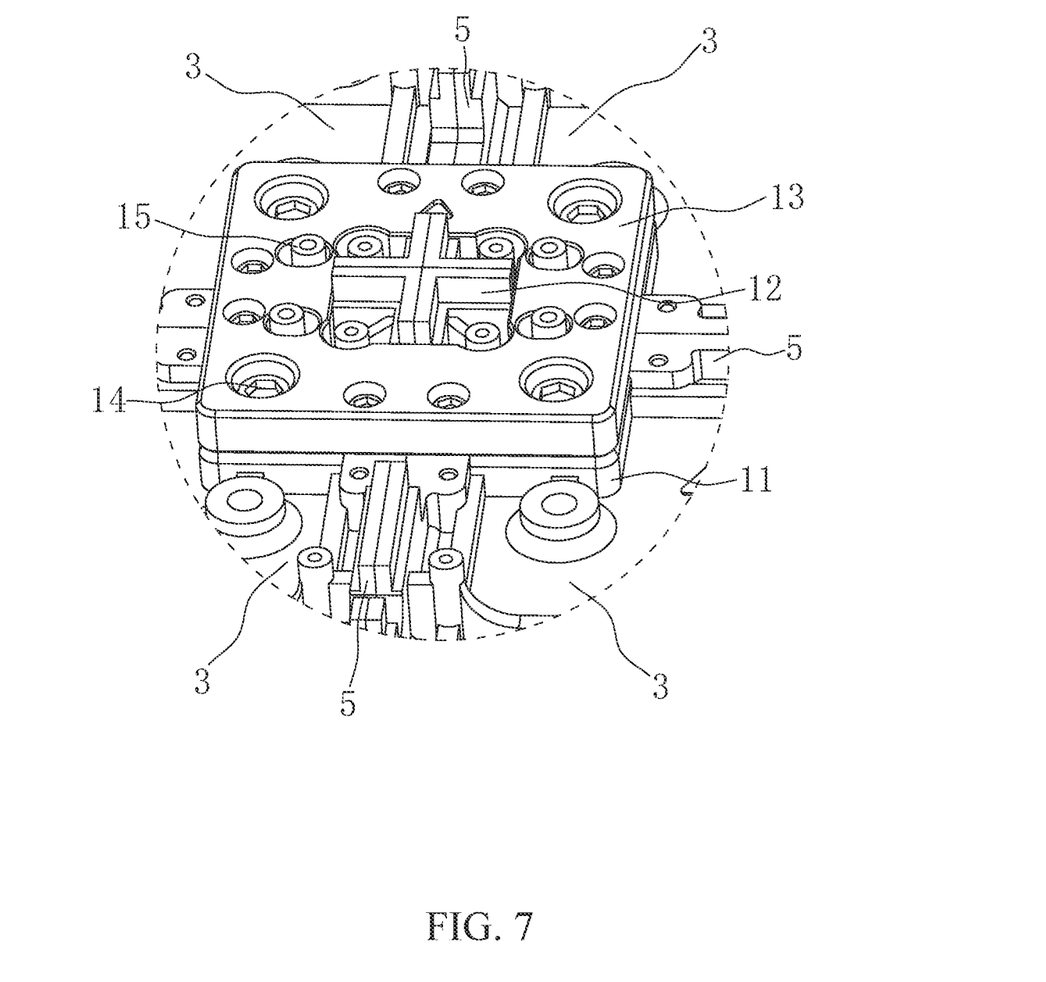
FIG. 7 is an enlarged view of B in FIG. 5, showing a structural schematic diagram that four adjacent housings are connected through a same splicing assembly.

With reference to FIGS. 5 and 7, when central axes of the plurality of housings 3 do not coincide and the central axes of the plurality of housings 3 are parallel, the splicing assembly 1 can connect four housings 3, and two adjacent splicing blocks 11 on the four housings 3 connected by the same splicing assembly 1 are abutted against each other.

When the number of the splicing block 11 of the splicing assembly 1 connecting the four housings 3 is four, one splicing block 11 is arranged on each housing 3, and the fixing base 13 with a round-shaped cross section connects the four splicing blocks 11 on the four housings 3.

Figure 8:
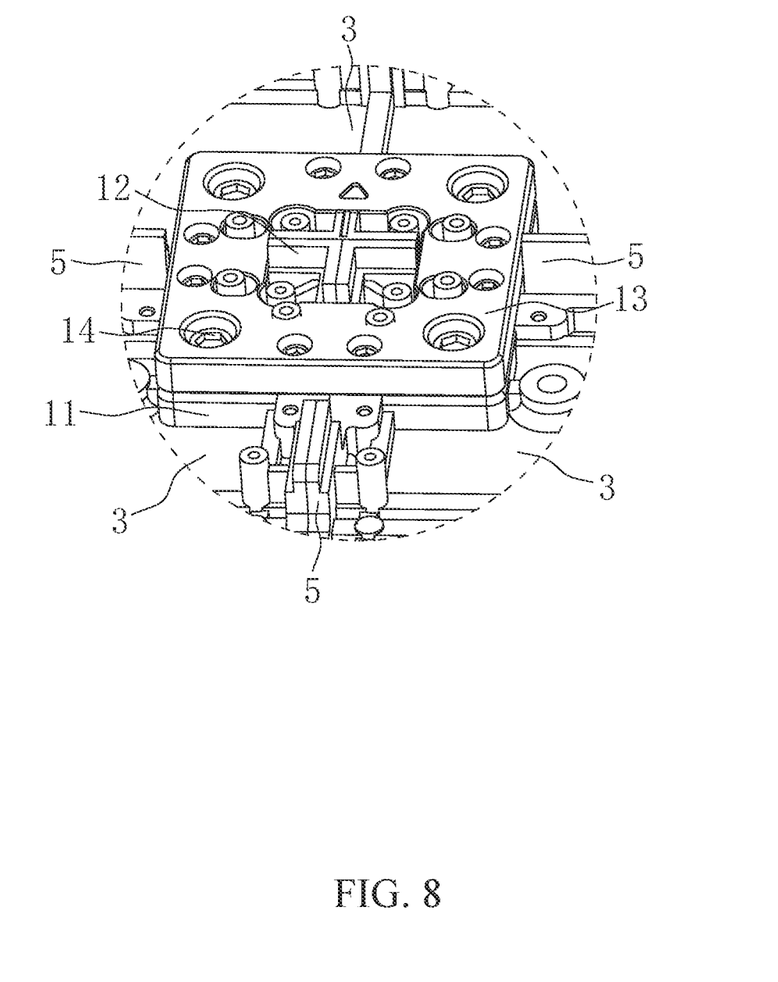
FIG. 8 is an enlarged view of C in FIG. 5, showing a structural schematic diagram that the splicing assembly is connected to three housings.

With reference to FIGS. 5 and 8, the splicing assembly 1 can connect three housings 3 when a length of the housing 3 in the length direction is a positive integer multiple of a length of the housing 3 in the width direction.

The three housings 3 connected by the same splicing assembly 1 are distributed in such a way that the side wall of the first housing 3 in the length direction is abutted against the side wall of the second housing 3 in the length direction, and the side wall of the first housing 3 in the width direction and the side wall of the second housing 3 in the width direction are both abutted against the side wall of the third housing 3 in the length direction.

The splicing blocks 11 of the splicing assembly 1 connecting the three housings 3 is four, where each of the first housing 3 and the second housing 3 is provided with one splicing block 11, and the third housing 3 is provided with two splicing blocks 11; and the fixing base 13 with a round-shaped cross section connects the four splicing blocks 11 on the three housings 3.

With reference to FIG. 6, a connecting plate 5 abutting against the display panel 4 is fixedly connected to a side wall of the housing 3, and an avoidance groove 51 is formed on the connecting plate 5; and the connecting plates 5 on the two housings 3 abutting against each other are abutted against each other.

The implementation principle of the assembled display panel provided by the present disclosure is as follows: when the fixing base 13 is connected to the splicing blocks 11 of the same splicing assembly 1, the splicing blocks 11 connected to the fixing base 13 will be located in a same reference plane, the housings 3 mounted with the splicing blocks 11 will be located in the same reference plane, and a plurality of display panels 4 will be accordingly located in the same reference plane.

Further, at least two housings 3 connected by one splicing assembly 1 do not affect the passage of connecting lines.

What are described above are all preferred examples of the present disclosure, and are not intended to limit the scope of protection of the present disclosure. Therefore, equivalent changes made according to the structure, shape and principle of the present disclosure should all fall within the scope of protection of the present disclosure.

What is claimed is:

1. A locking mechanism, comprising at least one splicing assembly, wherein the splicing assembly comprises at least two splicing blocks, a limiting protruding block, a fixing base and a locking screw rod, and the splicing blocks are configured for mounting on a housing supporting a display panel; the locking screw rod is vertically arranged on one side of the fixing seat close to the splicing block; and the locking screw rod is configured for connecting with the splicing block, such that the fixing base is abutted against the limiting protruding block; wherein the number of the splicing block is four, and adjacent two splicing blocks are close to each other; a limiting hole is formed on the fixing base, four splicing blocks are all abutted against the fixing base, four limiting protruding blocks all pass through the limiting hole, and the four limiting protruding blocks are all abutted against a side wall of the limiting hole; and wherein the fixing base is provided with a reinforcement assembly, wherein the reinforcement assembly comprises a snap bead and a spring, a sliding groove in communication with the limiting hole is formed on the fixing base, the snap bead is slidable in the sliding groove, and a slot is formed on the limiting protruding block for snap-fitting with the snap bead; and one end of the spring away from the snap bead is connected to the bottom wall of the sliding groove.

2. The locking mechanism according to claim 1, wherein the number of the splicing block is two;
    the fixing base comprises a first fixing portion, a second fixing portion and a third fixing portion, wherein the first fixing portion and the second fixing portion are respectively provided at both ends of the third fixing portion;
    the first fixing portion is abutted against one of the splicing blocks and one of the limiting protruding blocks, and the second fixing portion is abutted against the other splicing block and the other limiting protruding block;
    the first fixing portion is provided with the locking screw rod, and the locking screw rod on the first fixing portion is connected to the splicing block abutting against the first fixing portion; and
    the second fixing portion is provided with the locking screw rod, and the locking screw rod on the second fixing portion is connected to the splicing block abutting against the second fixing portion.

3. An assembled display panel, comprising the locking mechanism according to claim 1, wherein the assembled display panel comprises a plurality of housings and display panels, two adjacent housings are abutted against each other, and the display panels are arranged on the housings; and a same splicing assembly is connected with at least two housings;
    the splicing blocks of the same splicing assembly are allocated to the housings connected by the same splicing assembly, and at least one splicing block is arranged on each housing; and
    the fixing base of the same splicing assembly is connected to the splicing blocks of the same splicing assembly.

4. The assembled display panel according to claim 3, wherein the splicing assembly is connected with two housings, the number of the splicing blocks is two, one splicing block is arranged on each housing, and two splicing blocks located on the two splicing blocks are abutted against each other.

5. The assembled display panel according to claim 3, wherein the splicing assembly is connected with two housings, the number of the splicing blocks is four, four splicing blocks are arranged on each housing, and adjacent two splicing blocks are abutted against each other.

6. The assembled display panel according to claim 3, wherein the splicing assembly is connected with the four housings, the number of the splicing blocks is four, one splicing block is arranged on each housing, and adjacent two splicing blocks are abutted against each other.

7. The assembled display panel according to claim 3, wherein the splice assembly is connected with three housings, and the number of the splicing blocks is four;
- the side wall of the first housing in the length direction is abutted against the side wall of the second housing in the length direction, and the side wall of the first housing in the width direction and the side wall of the second housing in the width direction are both abutted against the side wall of the third housing in the length direction;
- the two splicing blocks are arranged on the third housing, the other two splicing blocks are arranged on the first housing and the second housing, respectively, and adjacent two splicing blocks are abutted against each other.

8. The assembled display panel according to claim 3, wherein the housing is provided with a connecting plate, and the connecting plates of two adjacent housings are abutted against each other; the display panel is abutted against the connecting plate, and an avoidance groove is formed on the connecting plate.

\* \* \* \* \*